US012568444B2

(12) United States Patent
Kim et al.

(10) Patent No.: US 12,568,444 B2
(45) Date of Patent: Mar. 3, 2026

(54) METHOD AND APPARATUS FOR LINK ADAPTATION BASED ON INTERFERENCE RECOGNITION

(71) Applicant: Korea University of Technology and Education Industry-University Cooperation Foundation, Cheonan-si (KR)

(72) Inventors: Won Tae Kim, Cheonan-si (KR); Han Jin Kim, Cheongju-si (KR); Young Jin Kim, Cheongju-si (KR)

(73) Assignee: Korea University of Technology and Education Industry-University Cooperation Foundation, Cheonan-si (KR)

( * ) Notice: Subject to any disclaimer, the term of this patent is extended or adjusted under 35 U.S.C. 154(b) by 246 days.

(21) Appl. No.: 18/329,601

(22) Filed: Jun. 6, 2023

(65) Prior Publication Data

US 2024/0365244 A1 Oct. 31, 2024

(30) Foreign Application Priority Data

Apr. 28, 2023 (KR) ........................ 10-2023-0056115

(51) Int. Cl.
*H04W 52/24* (2009.01)
*H04L 1/00* (2006.01)
*H04W 84/12* (2009.01)

(52) U.S. Cl.
CPC ........... *H04W 52/24* (2013.01); *H04L 1/0003* (2013.01); *H04W 84/12* (2013.01)

(58) Field of Classification Search
CPC ... H04W 52/24; H04W 52/243; H04W 84/12; H04L 1/0003
See application file for complete search history.

(56) References Cited

U.S. PATENT DOCUMENTS

| | | | |
|---|---|---|---|
| 7,171,161 B2 * | 1/2007 | Miller | ................. H04L 27/0012 |
| | | | 455/67.11 |
| 9,538,542 B2 * | 1/2017 | Duenyas | ............. H04W 72/541 |
| 2019/0132743 A1 | 5/2019 | Vanka et al. | |

* cited by examiner

*Primary Examiner* — Tuan H Nguyen
(74) *Attorney, Agent, or Firm* — STIP Law Group, LLC

(57) ABSTRACT

A link adaptation method in a wireless LAN (WLAN) system may be provided.

The link adaptation method according to an embodiment of the present disclosure may include: receiving signals within a communication environment; classifying the signals and identifying each of the signals; analyzing a channel access characteristic of each of the signals; adjusting a communication parameter of a target signal for each channel based on a result of the analyzing.

4 Claims, 4 Drawing Sheets

| | t-1 | t | t+1 |
|---|---|---|---|
| CHANNEL 4 | | MAINTAIN TXPOWER MAINTAIN MCS | MAINTAIN TXPOWER MAINTAIN MCS |
| CHANNEL 3 | | MAINTAIN TXPOWER MAINTAIN MCS | MAINTAIN TXPOWER MAINTAIN MCS |
| CHANNEL 2 | | MAINTAIN TXPOWER MAINTAIN MCS | MAINTAIN TXPOWER MAINTAIN MCS |
| CHANNEL 1 | ZIGBEE | MAINTAIN TXPOWER MAINTAIN MCS | MAINTAIN TXPOWER LOWER MCS |

710

METHOD AND APPARATUS FOR LINK ADAPTATION BASED ON INTERFERENCE RECOGNITION

CROSS-REFERENCE TO RELATED APPLICATIONS

This application claims the priority of the Korean Patent Application NO 10-2023-0056115, filed on Apr. 28, 2023, in the Korean Intellectual Property Office. The entire disclosures of all these applications are hereby incorporated by reference.

BACKGROUND

1. Field

One or more embodiments relate to a method and apparatus for link adaptation based on interference recognition, and more particularly, to a method and an apparatus for link adaptation based on interference recognition capable of improving communication quality by classifying interference sources in a communication environment and applying different link adaptation techniques in response to each classified interference source.

2. Description of the Related Art

Wireless communication devices adaptively adjust transmission parameters according to changes in channel states to improve communication quality. For example, in the IEEE 802.11 standard-based WLAN, communication quality is managed by adjusting a modulation and coding scheme to increase a data rate when a radio channel state is good and to lower a data rate when a radio channel state is bad.

A channel state changes depending on an environment in which a wireless communication device transmits and receives data, and other wireless devices in the same environment also affect the channel state. At this time, corresponding other wireless devices are interference sources and may adversely affect communication quality when the wireless communication device transmits and receives data. Because various wireless devices (WiFi, Bluetooth, ZigBee, etc.) may communicate without separate permission in an unlicensed band (ISM band), interference between devices may occur more frequently.

Existing link adaptation techniques do not specifically consider these other interference sources, and a receiver adjusts a data rate based on channel states (e.g., an RSSI value). However, because wireless standard devices using an unlicensed band access a channel using different standard techniques, higher communication quality may be expected when link adaptation is performed considering different access techniques of the wireless standard devices.

DESCRIPTION OF EMBODIMENTS

Technical Solution

One or more embodiments include a method and an apparatus for recognizing interference signals (wireless communication devices) and performing link adaptation considering a channel access method of the wireless communication devices.

The background described above is possessed or acquired by the inventor in the process of deriving the present disclosure, and is not necessarily known art published to the public prior to the filing of the present disclosure.

According to one or more embodiments, a link adaptation method in a wireless LAN (WLAN) system includes: receiving signals within a communication environment; classifying the signals and identifying each of the signals; analyzing a channel access characteristic of each of the signals; adjusting a communication parameter of a target signal for each channel based on a result of the analyzing.

The analyzing of the channel access characteristic may include analyzing a channel use pattern of each of the signals.

The analyzing of the channel use pattern may include analyzing a channel use period of each of the signals; and analyzing a channel use distribution of each of the signals.

The adjusting of the communication parameter may include adjusting transmission power of the target signal; and adjusting a modulation and coding scheme (MCS) of the target signal.

The identifying of each of the signals may include determining whether the new signal uses a target band corresponding to a target signal of the WLAN system; determining whether the signals originate from a non-communication device based on the determination that the new signal uses the target band; determining whether the signals originate from a Bluetooth device based on the determination that the new signal uses the target band; and determining whether the signals originate from a ZigBee device based on the determination that the new signal uses the target band.

The adjusting of the communication parameter may include increasing transmission power and a modulation and coding scheme of the target signal based on the determination that the identified signal is a signal originating from the non-communication device.

The adjusting of the communication parameter may include not changing the transmission power and the modulation and coding scheme of the target signal when the identified signal is a signal originating from the Bluetooth device and the Bluetooth device has an adaptive frequency hopping (AFH) characteristic.

The adjusting of the communication parameter may include lowering the transmission power and the modulation and coding scheme of the target signal after a first time period without changing the transmission power and the modulation and coding scheme of the target signal in the first time period based on the determination that the identified signal is a signal originating from the ZigBee device.

BRIEF DESCRIPTION OF THE DRAWINGS

These and/or other aspects will become apparent and more readily appreciated from the following description of the embodiments, taken in conjunction with the accompanying drawings in which:

FIG. 7 is a view for explaining a link adaptation method when an interference source is a ZigBee device according to an embodiment.

DETAILED DESCRIPTION

Hereinafter, embodiments of the present invention will be described with reference to the drawings. In the following description, descriptions of a well-known technical configuration in relation to a lead implantation system for a deep brain stimulator will be omitted. For example, descriptions of the configuration/structure/method of a device or system commonly used in deep brain stimulation, such as the structure of an implantable pulse generator, a connection structure/method of the implantable pulse generator and a lead, and a process for transmitting and receiving electrical signals measured through the lead with an external device, will be omitted. Even if these descriptions are omitted, one of ordinary skill in the art will be able to easily understand the characteristic configuration of the present invention through the following description.

Figure 1:
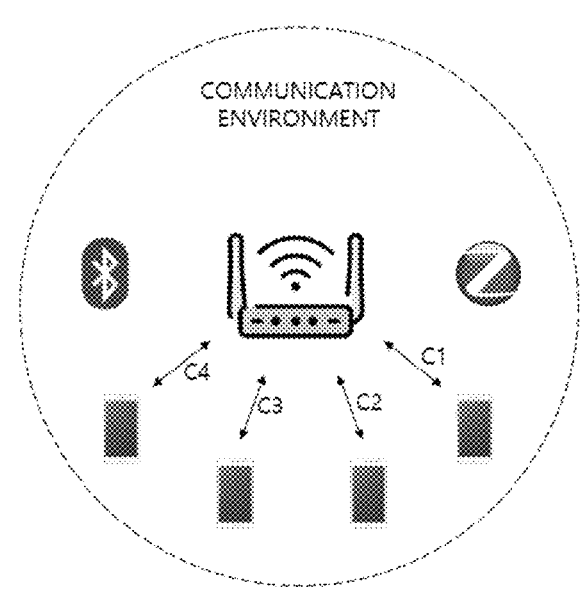
FIG. 1 is a view for explaining a wireless LAN (WLAN) system according to an embodiment.

FIG. 1 is a view for explaining a wireless LAN (WLAN) system according to an embodiment.

Referring to FIG. 1, in the WLAN system according to an embodiment, an access point (AP) and stations (STAs) may transmit and receive data through a plurality of channels (e.g., channels 1 to 4 shown in FIG. 1). A station may be referred to as a target device or the like to be distinguished from a wireless communication device, a mobile device, or an interference source to be described later.

Wireless communication devices may adaptively adjust transmission parameters according to changes in channel states to improve communication quality. For example, in the IEEE 802.11 standard-based WLAN, communication quality is managed by adjusting a modulation and coding scheme to increase a data rate when a radio channel state is good and to lower a data rate when a radio channel state is bad.

A channel state changes depending on an environment in which a wireless communication device transmits and receives data, and other wireless devices in the same environment also affect the channel state. At this time, the corresponding other wireless devices are interference sources and may adversely affect communication quality when the wireless communication device transmits and receives data.

For example, an environment in which an IEEE 802.11-based WiFi devices communicate is a communication environment using an industrial scientific medical (ISM) band in which Bluetooth, ZigBee, or a microwave oven exists in addition to other target devices. In more detail, an ISM band used by WiFi may be used for purposes other than telecommunication, such as industrial, scientific, medical, and home use.

In an unlicensed band (e.g., ISM band), because various wireless devices (e.g., WiFi, Bluetooth, ZigBee, etc.) may perform communication without separate permission, interference between devices may occur more frequently.

Some comparable existing link adaptation techniques do not specifically consider these other interference sources, and a receiver adjusts a data rate based on a channel state (e.g., an RSSI value). In the ISM band, joint use that tolerates mutual interference is premised, and small power is based on minimizing interference. Because wireless standard devices (hereinafter referred to as interference sources) using a unlicensed band access a channel using different standard techniques, higher communication quality may be expected when link adaptation is performed considering different access techniques of the wireless standard devices.

As will be described in detail below, a link adaptation method according to an embodiment may recognize interference signals and perform link adaptation considering a channel access method of corresponding devices.

Link adaptation according to an embodiment is a technique of adaptively adjusting a communication parameter according to a change in a channel state, and may include power control, rate control, H-ARQ, and the like. Link adaptation aims to increase transmission rate, system capacity, and frequency efficiency, and a main transmission parameter for link adaptation may include transmission power, modulation and coding scheme (MCS), spreading factor, and the like. However, the scope of a link adaptation technology is not limited thereto.

In an unlicensed band such as a 2.4 Ghz band, various wireless devices may cause cross-technology interference. Such interference may adversely affect wireless communication quality. Considering interference caused by other technologies in applying the link adaptation technology, a significant improvement in communication quality may be expected.

For example, IEEE 802.11 standard-based wireless devices of FIG. 1 may perform orthogonal frequency-division multiple access (OFDMA)-based communication, and Bluetooth and ZigBee devices may coexist in such a communication environment. At this time, the ZigBee device uses channel 1, and the Bluetooth device uses channel 3, and as channel 3 is frequently used, the channel used may be changed to channel 4 according to an adaptive frequency hopping (AFH) technology.

In this situation, when the devices are identified by identifying corresponding signals and channel access characteristics of the devices are analyzed, communication quality may be improved by applying appropriate link adaptation.

Figure 2:
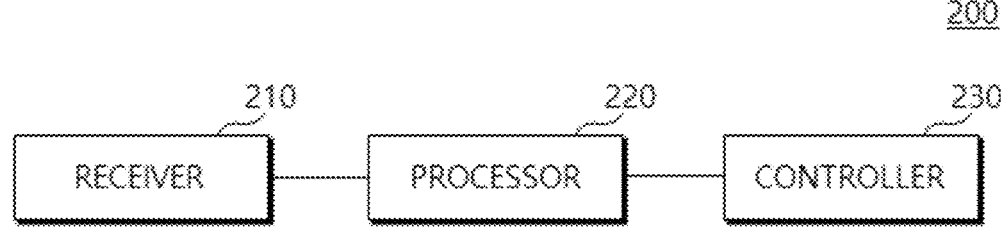
FIG. 2 is a block diagram of a link adaptation apparatus according to an embodiment.

FIG. 2 is a block diagram of a link adaptation apparatus according to an embodiment.

Referring to FIG. 2, a link adaptation apparatus 200 according to an embodiment may include a receiver 210, a processor 220, and a controller 230. However, the elements, shown in FIG. 2, are not essential elements. The link adaptation apparatus 200 may be implemented by using more or less elements than those shown in FIG. 2. For example, in addition to the receiver 210, the processor 220, and the controller 230 according to an embodiment, the link adaptation apparatus 200 according to an embodiment may further include a sensor and a memory in addition to the receiver 210, the processor 220, and the controller 230. Terms such as "unit", "er", "or", and the like described herein refer to units that perform at least one function or operation, and the units may be implemented as hardware or software or as a combination of hardware and software.

The receiver 210 according to an embodiment may receive signals within a communication environment.

The processor 220 according to an embodiment may identify signals of wireless devices in a communication environment and analyze radio channel access characteristics of corresponding devices.

The controller 230 according to an embodiment may control a link adaptation technique.

The processor 220 and the controller 230 according to an embodiment may be a hardware-implemented device having a circuit having a physical structure for executing desired operations. The desired operations may include code or instructions included in a program. The hardware-implemented device may include a microprocessor, a central processing unit (CPU), a graphic processing unit (GPU), a processor core, a multi-core processor, a multiprocessor, an application-specific integrated circuit (ASIC), a field programmable gate array (FPGA), a neural processing unit (NPU), and the like.

The memory may store computer-readable instructions. When instructions stored in the memory are executed by the processor 220 and the controller 230, the processor 220 and the controller 230 may process operations defined by the instructions. The memory may include, for example, random access memories (RAM), dynamic RAM (DRAM), static random access memories (SRAM), or other forms of non-volatile memory known in the art.

Figure 3:
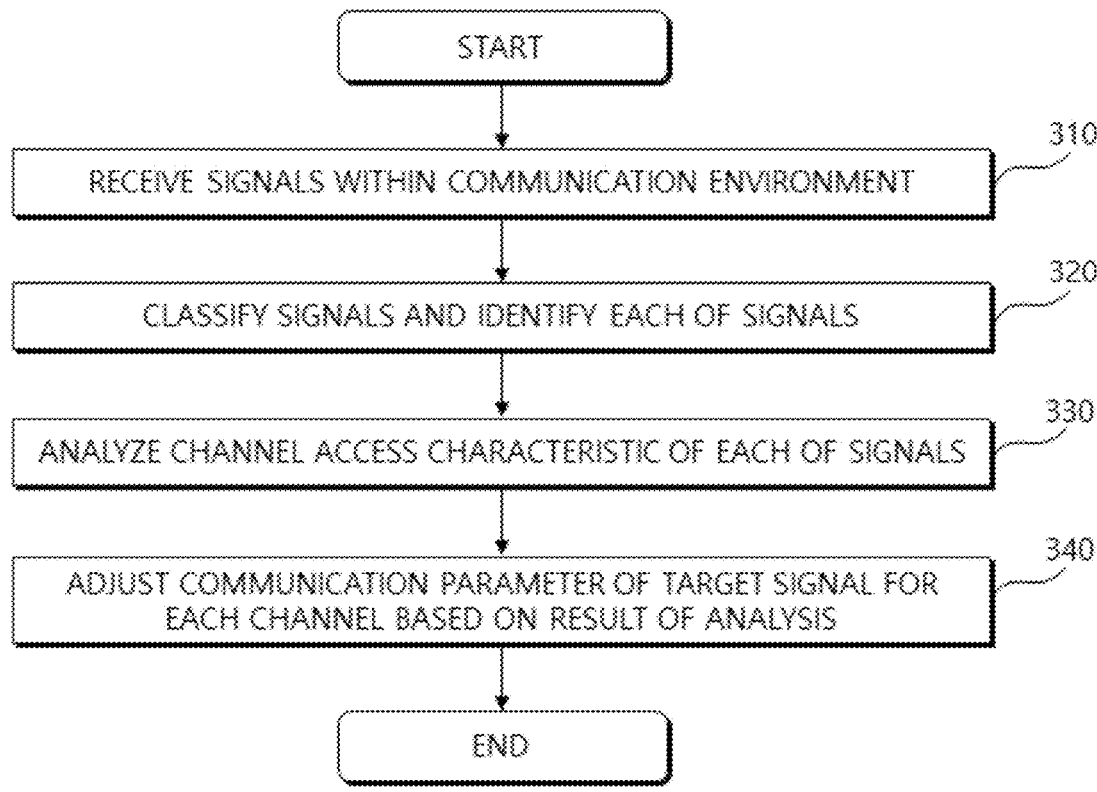
FIG. 3 is a view for explaining a link adaptation method according to an embodiment.

FIG. 3 is a view for explaining a link adaptation method according to an embodiment.

For convenience of explanation, operations 310 to 340 are described as being performed using the link adaptation apparatus 200 shown in FIG. 3. However, operations 310 to 340 may be used via any other suitable electronic device, and within any suitable system.

In addition, operations of FIG. 3 may be performed in the illustrated order and manner, but the order of some operations may be changed or some operations may be omitted without departing from the spirit and scope of the illustrated embodiment. A number of operations shown in FIG. 3 may be performed in parallel or concurrently.

In operation 310, a link adaptation apparatus according to an embodiment may receive signals within a communication environment. The link adaptation apparatus may receive signals within a communication environment through a receiver (e.g., the receiver 210 of FIG. 2). The received signal may include a target signal and an interference signal. A target signal of a WLAN system according to an embodiment is a target signal of the WLAN system. For example, in the WLAN system according to an embodiment, a signal using an 802.11ax frame may be a target signal. An interference signal according to an embodiment may be a signal caused by an interference source (e.g., microwave oven, Bluetooth device, ZigBee device, etc.).

In operation 320, the link adaptation apparatus according to an embodiment may classify signals and identify each of the signals. The link adaptation apparatus may identify signals of wireless devices within a communication environment through a processor (e.g., the processor 220 of FIG. 2).

In operation 330, the link adaptation apparatus according to an embodiment may analyze a channel access characteristic of each of the signals. The link adaptation apparatus may identify corresponding signals and identify an interference source corresponding to each of the corresponding signals.

The link adaptation apparatus may analyze a channel access characteristic of each of the corresponding signals. For example, the link adaptation apparatus may analyze a channel use pattern of each of the signals. In more detail, the link adaptation apparatus may analyze a channel use period of each signal and/or a channel use distribution of each signal. For example, the link adaptation apparatus may analyze a channel mainly used by a corresponding signal, determine whether mutual interference can be minimized through a technique such as adaptive frequency hopping, and determine a channel use period.

In operation 340, the link adaptation apparatus according to an embodiment may adjust a communication parameter of a target signal for each channel based on a result of the analysis. The link adaptation apparatus may adjust transmission power of a target signal based on the result of the analysis. For example, based on the result of the analysis, the link adaptation apparatus may increase, decrease, or leave the transmission power of the target signal for each channel. The link adaptation apparatus may also adjust the degree of upward adjustment and downward adjustment according to the result of the analysis.

The link adaptation apparatus may adjust an MCS of a target signal. For example, based on the result of the analysis, the link adaptation apparatus may increase, decrease, or leave an MCS of a target signal for each channel. Similarly, the link adaptation apparatus may also adjust the degree of upward adjustment and downward adjustment according to the result of the analysis.

As described above, Bluetooth, ZigBee, and microwave oven may use the same ISM band as WiFi.

The link adaptation apparatus according to an embodiment may determine whether an identified signal is a signal originating from a non-communication device. For example, the non-communication device may be a microwave oven using the ISM band, but the present disclosure is not limited thereto. Hereinafter, a link adaptation method when an interference source is a non-communication device will be described in detail with reference to FIG. 4.

Based on the determination that a new signal uses a target band, the link adaptation apparatus according to an embodiment may determine whether the new signal is a signal originating from a Bluetooth device. Hereinafter, the link adaptation method when an interference source is a Bluetooth device will be described in detail with reference to FIGS. 5 and 6.

Based on the determination that a new signal uses a target band, the link adaptation apparatus according to an embodiment may determine whether the new signal is a signal originating from a ZigBee device. Hereinafter, the link adaptation method when an interference source is a ZigBee device will be described in detail with reference to FIG. 7.

Figure 4:
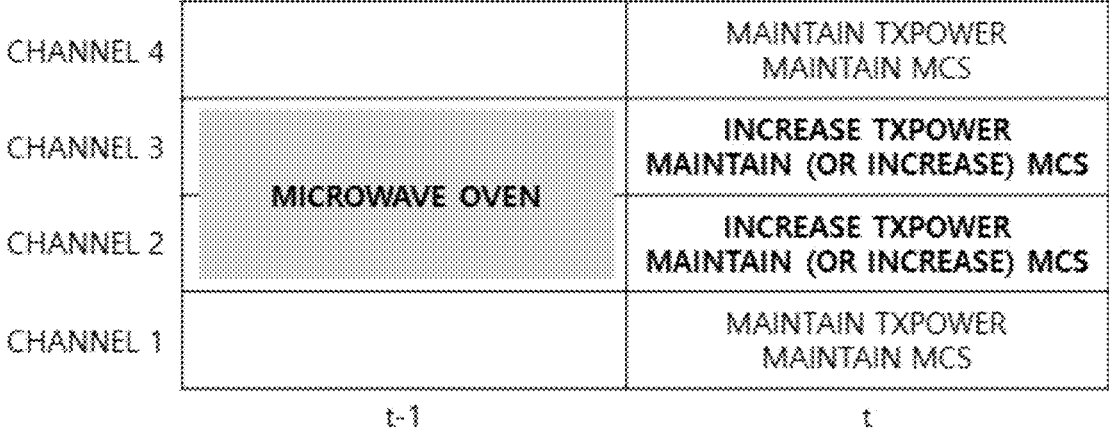
FIG. 4 is a view for explaining a link adaptation method when an interference source is a non-communication device according to an embodiment.

FIG. 4 is a view for explaining a link adaptation method when an interference source is a non-communication device according to an embodiment.

When communication devices exist on the same channel, transmission power cannot be indiscriminately increased for the purpose of using a fair communication channel. Because a microwave oven is not a device for communication, there may be no abnormality in operation even if interference is received within the same frequency during operation of the microwave oven. Accordingly, when the interference source is a non-communication device (e.g., a microwave oven), the link adaptation apparatus may increase transmission power of a target signal. In addition, because the transmission power is increased, the link adaptation apparatus may also increase an MCS of the target signal (or may leave the MCS unchanged).

Referring to FIG. 4, when the link adaptation apparatus identifies that the microwave oven is using channels 2 and 3 in time period (t−1), the link adaptation apparatus may increase transmission power and MCS of target signals of channels 2 and 3 in time period t.

Figure 5:
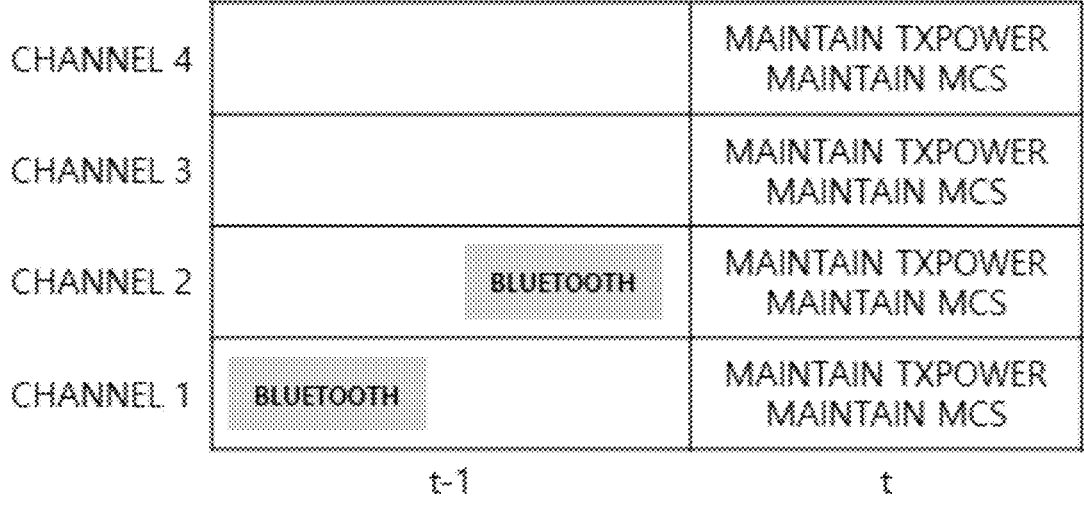
FIGS. 5 and 6 are views for explaining a link adaptation method when an interference source is a Bluetooth device according to an embodiment.
Figure 6:
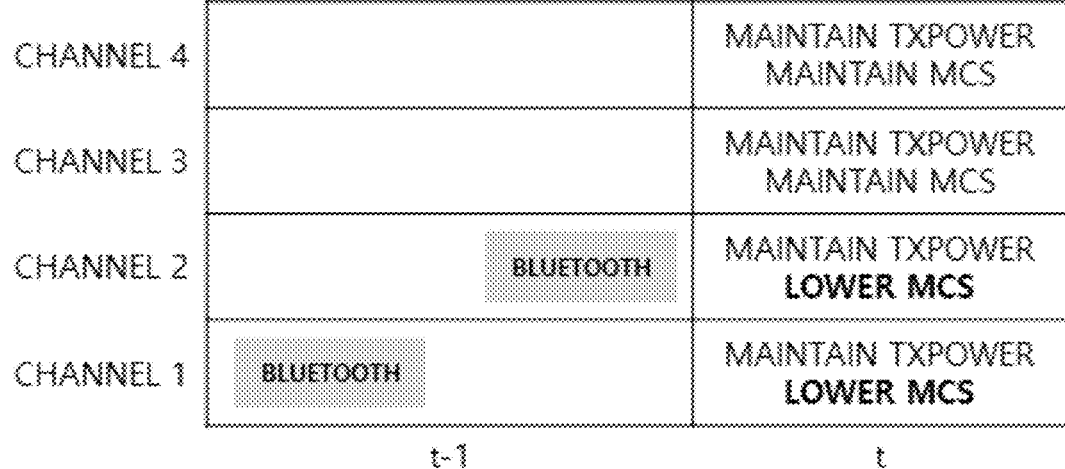

FIGS. 5 and 6 are views for explaining a link adaptation method when an interference source is a Bluetooth device according to an embodiment.

The Bluetooth device may use a frequency hopping technology as an access method. In addition, the Bluetooth device also applies an adaptive frequency hopping technology to avoid interference with devices using the same channel, such as WiFi and ZigBee (collision is detected during channel scan and a corresponding channel is excluded when dynamically hopping).

When the Bluetooth device uses an adaptive frequency hopping technology, if another wireless device within the same channel is communicating, a corresponding channel is not used, so the Bluetooth device may be treated as absent. Accordingly, in this case, the link adaptation apparatus may leave transmission power and MCS of a target signal unchanged.

Referring to 510 in FIG. 5, when the link adaptation apparatus identifies that a Bluetooth device is using channels 1 and 2 in time period (t−1) and that the Bluetooth device has an adaptive frequency hopping characteristic, the link adaptation apparatus may leave transmission power and MCS of target signals of channels 2 and 3 unchanged in time period t.

On the other hand, because a Bluetooth device that does not use an adaptive frequency hopping technology may cause interference by using the same channel as that of a Bluetooth device that uses an adaptive frequency hopping technology, the link adaptation apparatus may perform relatively robust communication by lowering an MCS of a target signal.

Referring to 610 in FIG. 6, when the link adaptation apparatus identifies that a Bluetooth device is using channels 1 and 2 in time period (t−1) and that the Bluetooth device does not have an adaptive frequency hopping characteristic, the link adaptation apparatus may lower an MCS of target signals of channels 2 and 3 unchanged in time period t.

FIG. 7 is a view for explaining a link adaptation method when an interference source is a ZigBee device according to an embodiment.

Although a signal originating from the ZigBee device is not an negligible signal like signals originating from the microwave oven and the Bluetooth device to which the adaptive frequency hopping technology is applied, because a communication interval is basically long, the ZigBee device and the link adaptation apparatus may not interfere with each other even if SR is attempted within a few seconds after identifying the signal originating from the ZigBee device (because the ZigBee device within the same channel do not transmit a communication signal).

In other words, the link adaptation apparatus may perform robust communication by using an MCS for a few seconds (no interference expected) after identifying a signal of the ZigBee device and lowering the MCS after a few seconds (interference is expected to occur).

Referring to 710 in FIG. 7, when the link adaptation apparatus identifies that a ZigBee device is using channel 1 in time period (t−1), the link adaptation apparatus may leave transmission power and MCS of a target signal of channel 1 unchanged in time period t, and may lower the MCS of the target signal of channel 1 in time period (t+1). A unit time in FIG. 7 may be determined based on a ZigBee communication interval. For convenience of explanation, FIGS. 4 to 7 have been described based on time period (t−1) and time period t, but unit times of FIGS. 4 to 7 may be different from each other.

In concluding the detailed description, those skilled in the art will appreciate that many variations and modifications may be made to the preferred embodiments without substantially departing from the principles of the present invention. Therefore, the disclosed preferred embodiments of the invention are used in a generic and descriptive sense only and not for purposes of limitation.

What is claimed is:

1. A link adaptation method in a wireless LAN (WLAN) system, the link adaptation method comprising:
   receiving signals within a communication environment;
   classifying the signals and identifying each of the signals;
   analyzing a channel access characteristic of each of the signals; and
   adjusting a communication parameter of a target signal for each channel based on a result of the analyzing,
   wherein the identifying of each of the signals comprises:
   determining whether the new signal uses a target band corresponding to a target signal of the WLAN system;
   determining whether the signals originate from a non-communication device based on the determination that the new signal uses the target band;
   determining whether the signals originate from a Bluetooth device based on the determination that the new signal uses the target band; and
   determining whether the signals originate from a ZigBee device based on the determination that the new signal uses the target band,
   wherein the adjusting of the communication parameter comprises:
   increasing transmission power, a modulation and coding scheme of the target signal based on the determination that the identified signal is a signal originating from the non-communication device.

2. The link adaptation method of claim 1, wherein the analyzing of the channel access characteristic comprises analyzing a channel use pattern of each of the signals.

3. The link adaptation method of claim 2, wherein the analyzing of the channel use pattern comprises:
   analyzing a channel use period of each of the signals; and
   analyzing a channel use distribution of each of the signals.

4. The link adaptation method of claim 1, wherein the adjusting of the communication parameter comprises:
   adjusting transmission power of the target signal; and
   adjusting a modulation and coding scheme (MCS) of the target signal.

* * * * *